June 15, 1948.  W. R. JACKSON  2,443,249
ADJUSTABLE TEMPLE FOR EYEGLASSES
Filed July 20, 1945

Inventor
William R. Jackson

By Clarence A. O'Brien
and Harvey B. Jackson
Attorneys

Patented June 15, 1948

2,443,249

UNITED STATES PATENT OFFICE 2,443,249

ADJUSTABLE TEMPLE FOR EYEGLASSES

William R. Jackson, Tucson, Ariz.

Application July 20, 1945, Serial No. 606,143

1 Claim. (Cl. 88—52)

The present invention relates to new and useful improvements in eyeglasses, and more particularly to an adjustable temple by means of which the ear-engaging rear end of the temple may be adjusted to a desired length in accordance with the sides of a head of a person wearing the eyeglasses.

More specifically, the invention embodies the construction of a temple bar formed of two sections telescopically arranged, the front section being connected with the lens frame and the rear section being formed with the ear-engaging member, together with means for holding the sections in longitudinally adjusted position.

An important object of the present invention is to provide an adjustable temple of this character in which none of the working parts provided for the adjustment of the temple protrudes on the outside thereof to mar the beauty of the temple or to cause discomfort to the wearer.

A further object of the invention is to provide a device of this character of simple and practical construction, which is neat and attractive in appearance, relatively inexpensive to manufacture, and otherwise well adapted for the purposes for which the same is intended.

Other objects and advantages reside in the details of construction and operation, as more fully hereinafter described and claimed, reference being had to the accompanying drawing forming part hereof, wherein like numerals refer to like parts throughout, and in which:

Figure 1:
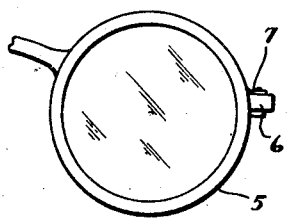
Figure 1 is a view in elevation of an eyeglass frame to which the temple is attached.
Figure 2:
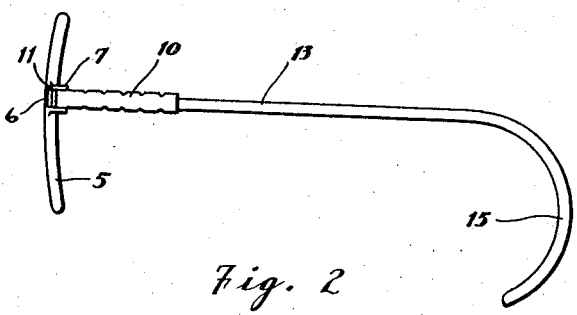
Figure 2 is a side elevational view.
Figure 3:
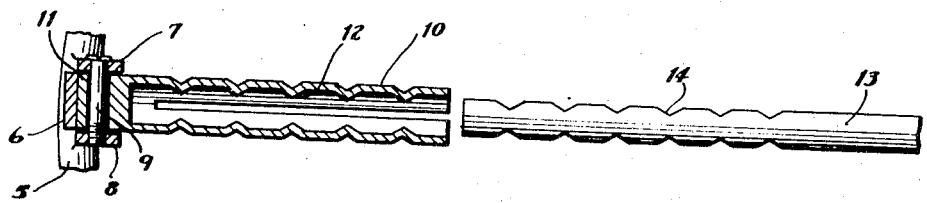
Figure 3 is an enlarged longitudinal sectional view of the longitudinally split sleeve forming the inner section of the temple, and with a portion of the outer section of the temple shown in elevation.

Referring now to the drawing in detail, wherein for the purpose of illustration I have disclosed a preferred embodiment of the invention, the numeral 5 designates an eyeglass frame having an outwardly projecting lug 6 at its outer edge and also formed with upper and lower, spaced-apart, outwardly projecting lugs 7 and 8 positioned immediately rearwardly of the lug 6.

A pin 9 extends vertically between the lugs 7 and 8 and to which the inner end of the inner temple section 10 is pivotally attached, said inner end of the section 10 of the temple also having a laterally projecting lug 11 at its pivoted inner end adapted to abut the lug 6 of the frame to limit outward swinging movement of the temple.

The inner section 10 of the temple is constructed in the form of a longitudinally split sleeve which is closed at its pivoted end.

The sleeve 10 forming the inner section of the temple may be constructed of any suitable material, such as light weight metal, plastic, or the like, and is formed with internal lugs 12 at longitudinally spaced intervals by pressing inwardly portions of the material at the outer surface of the sleeve.

Figure 4:
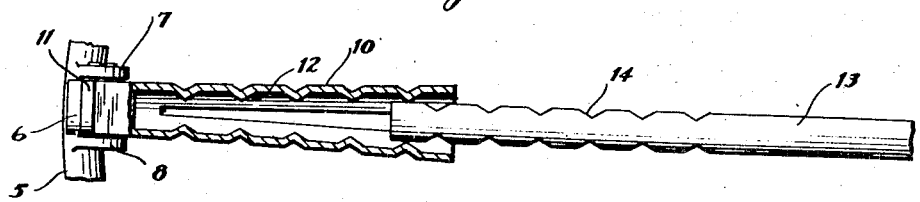
Figure 4 is a similar view showing the sections of the temple ready for assembly.
Figure 5:
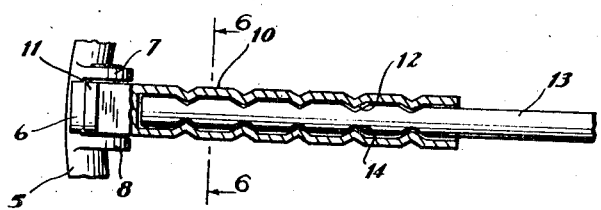
Figure 5 is a similar view showing the sections of the temple connected to each other.
Figure 6:
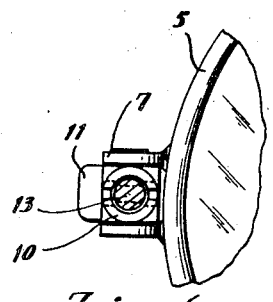
Figure 6 is a transverse sectional view taken substantially on a line 6—6 of Figure 5.
Figure 7:
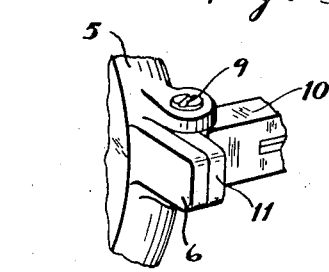
Figure 7 is a perspective view of the construction for connecting the inner section of the temple to the eyeglass frame.

The longitudinally split sections of the sleeve may be expanded into an open position, as shown in Figure 4 of the drawing, to receive the outer solid temple section 13 having its inner end formed with notches or grooves 14 adapted to receive the lugs 12 of the sleeve to secure the inner and outer sections of the temple in longitudinally adjusted position one within the other, in the manner as illustrated in Figure 5 of the drawing.

The outer end of the section 13 may be curved, as indicated at 15, to form the ear-engaging member.

The inner section 10 of the temple is preferably constructed of resilient material to facilitate the expanding thereof to permit adjustment of the outer section 13 therein, and the outer section 13 may also be rotated in the sleeve 10 to move the ear-engaging member 15 inwardly or outwardly against the side of a person's head in accordance with the requirements to provide a comfortable fit for the temple bar against the side of the head.

In view of the foregoing description, taken in conjunction with the accompanying drawing, it is believed that a clear understanding of the construction, operation and advantages of the device will be quite apparent to those skilled in the art. A more detailed description is accordingly deemed unnecessary.

It is to be understood, however, that even though I have herein shown and described a preferred embodiment of my invention, the same is susceptible to certain changes fully comprehended by the spirit of the invention as herein described and the scope of the appended claim.

Having thus described the invention, what I claim is:

A temple for eyeglasses comprising inner and outer telescoping temple sections, the inner one of which comprises a sleeve having a closed end adapted to be attached to said eyeglasses, said sections being endwise slidable relatively for varying the length of the temple, inwardly pressed lugs on the sleeve spaced apart in longitudinal rows upon opposite sides of the same, and recesses in the outer sections spaced apart in longitudinal rows upon opposite sides thereof for interlocking with said lugs to oppose endwise sliding of said sections, said sleeve being longitudinally split for spreading apart to provide for endwise sliding of the sections while said lugs and recesses are positioned for interlocking, said lugs and recesses providing for relative rotation of said sections to adjust the angular position of the outer section relative to the inner section while said lugs and recesses are interlocked, said lugs and recesses being constructed and arranged to provide for relative rotation of said sections to break the interlock between the lugs and recesses so that said sections may be easily pulled apart endwise.

WILLIAM R. JACKSON.

REFERENCES CITED

The following references are of record in the file of this patent:

UNITED STATES PATENTS

| Number | Name | Date |
|---|---|---|
| 1,747,843 | Ritholz | Feb. 18, 1930 |
| 1,919,731 | Kates | July 25, 1933 |
| 2,129,458 | Ashley | Sept. 6, 1938 |

FOREIGN PATENTS

| Number | Country | Date |
|---|---|---|
| 291,156 | Great Britain | May 29, 1928 |
| 303,716 | Great Britain | Jan. 10, 1929 |